(12) United States Patent
Marenco et al.

(10) Patent No.: US 10,873,411 B1
(45) Date of Patent: Dec. 22, 2020

(54) OPTIMIZING SPECTRAL EFFICIENCY FOR A CONFIGURATION OF AN OPTICAL NETWORK

(71) Applicant: Cisco Technology, Inc., San Jose, CA (US)

(72) Inventors: Giovanni Marenco, Novara (IT); Claudio Crognale, Monza (IT); Davide Sirtori, Carate Brianza (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/661,381

(22) Filed: Oct. 23, 2019

(51) Int. Cl.
  *H04J 14/02* (2006.01)
  *H04B 10/27* (2013.01)
  *H04B 10/079* (2013.01)

(52) U.S. Cl.
  CPC .... *H04J 14/0227* (2013.01); *H04B 10/07953* (2013.01); *H04B 10/27* (2013.01)

(58) Field of Classification Search
  CPC .......................... H04J 14/0227; H04J 14/0241
  See application file for complete search history.

(56) References Cited

U.S. PATENT DOCUMENTS

| | | | |
|---|---|---|---|
| 7,986,878 B2 | 7/2011 | Saunders et al. | |
| 8,467,676 B2 | 6/2013 | Villarruel et al. | |
| 10,148,384 B2 * | 12/2018 | Swinkels | H04J 14/0227 |
| 2002/0114562 A1 * | 8/2002 | Bigo | H04J 14/06 385/24 |
| 2003/0035628 A1 * | 2/2003 | Putnam | G02B 6/29383 385/37 |
| 2013/0022355 A1 * | 1/2013 | Charlet | H04J 14/0213 398/48 |

(Continued)

OTHER PUBLICATIONS

Macho, Andrés, "Wavelets in High Capacity DWDM Systems and Modal Division Multiplexed Transmissions", Advanced Optical Communications II, Technology and Communications Systems Master (ETSIT-UPM), Final Work 2014, http://oa.upm.es/32590/, Jun. 1, 2014, 13 pages.

(Continued)

*Primary Examiner* — Nathan M Cors
(74) *Attorney, Agent, or Firm* — Edell, Shapiro & Finnan, LLC

(57) ABSTRACT

A method of configuring an optical link with an optimized spectral efficiency and bit rate is provided. The method includes obtaining, by a controller of an optical network, a baseline configuration that includes a traffic mode that uses a predetermined channel spacing of a plurality of channels in a frequency spectrum. The plurality of channels are used for transmitting optical signals on an optical link in the optical network. The method further includes selecting three contiguous channels that include a center channel and two adjacent channels and while maintaining a performance parameter above or equal to a threshold value, moving the adjacent channels closer to the center channel and varying at least one transmission parameter, thereby reducing a spacing of the center channel. As such, a spectral frequency map is generated in which the channel spacing is reduced and an optical link is configured based on the spectral frequency map.

20 Claims, 7 Drawing Sheets

(56) References Cited

U.S. PATENT DOCUMENTS

2016/0072608 A1* 3/2016 Wright ............... H04J 14/0241
398/49
2017/0332580 A1* 11/2017 Buffard ................... A01H 1/02

OTHER PUBLICATIONS

Yin, Yawei et al., "Software Defined Elastic Optical Networks for Cloud Computing", https://ieeexplore.ieee.org/ document/7736620, Nov. 7, 2016, 5 pages.
Acacia Communications, "Network Optimization in the 600G Era", Dec. 18, 2018, Network-Optimization-in-the-600G-Era-WP1218. pdf, 9 pages.

* cited by examiner

600

┌─────────────────────────────────────────────────────────────┐
│ OBTAIN A BASELINE CONFIGURATION THAT INCLUDES A TRAFFIC MODE THAT │ 602
│ USES A PREDETERMINED CHANNEL SPACING OF A PLURALITY OF CHANNELS IN A │
│ FREQUENCY SPECTRUM, WHERE THE CHANNELS ARE USED FOR TRANSMITTING │
│ OPTICAL SIGNALS ON AN OPTICAL LINK IN THE OPTICAL NETWORK │
└─────────────────────────────────────────────────────────────┘
                              │
                              ▼
┌─────────────────────────────────────────────────────────────┐
│ SELECT THREE CONTIGUOUS CHANNELS FROM AMONG THE PLURALITY OF │ 604
│ CHANNELS OF THE FREQUENCY SPECTRUM, WHERE THE THREE CONTIGUOUS │
│ CHANNELS INCLUDE A CENTER CHANNEL AND TWO ADJACENT CHANNELS │
└─────────────────────────────────────────────────────────────┘
                              │
                              ▼
┌─────────────────────────────────────────────────────────────┐
│ WHILE MAINTAINING A PERFORMANCE PARAMETER ABOVE OR EQUAL TO A │ 606
│ THRESHOLD VALUE, MOVE THE ADJACENT CHANNELS CLOSER TO THE CENTER │
│ CHANNEL AND VARY AT LEAST ONE TRANSMISSION PARAMETER, THEREBY │
│ REDUCING A SPACING OF THE CENTER CHANNEL WITH RESPECT TO THE TWO │
│ ADJACENT CHANNELS │
└─────────────────────────────────────────────────────────────┘
                              │
                              ▼
┌─────────────────────────────────────────────────────────────┐
│ GENERATE A SPECTRAL FREQUENCY MAP IN WHICH THE CHANNEL SPACING IS │ 608
│ REDUCED WITH RESPECT TO THE BASELINE CONFIGURATION BASED ON │
│ REDUCING THE SPACING OF THE CENTER CHANNEL │
└─────────────────────────────────────────────────────────────┘
                              │
                              ▼
┌─────────────────────────────────────────────────────────────┐
│ CONFIGURE, VIA AN OPTICAL NETWORK ELEMENT IN THE OPTICAL NETWORK, │ 610
│ THE OPTICAL LINK BASED ON THE SPECTRAL FREQUENCY MAP │
└─────────────────────────────────────────────────────────────┘

FIG.6

OPTIMIZING SPECTRAL EFFICIENCY FOR A CONFIGURATION OF AN OPTICAL NETWORK

TECHNICAL FIELD

The present disclosure relates to optical networks.

BACKGROUND

Optical networks are commonly employed to transmit data across long distances. Wavelength-division multiplexing (WDM) network and a dense wavelength-divisional multiplexing (DWDM) techniques may be employed to improve the spectral efficiency of an optical network. WDM and DWDM techniques involve transmitting data in optical signals at different wavelengths over a common or shared optical fiber, sometimes referred to as an optical link or an optical fiber cable. One example of this optical link is a Network Convergence System (NCS) 1004-based DWDM Submarine Optical Link that stretches on an ocean floor.

When an optical link is installed, it needs to be configured. To configure the optical link, the operator attempts to maximize Spectral Efficiency (SE). The SE is a line rate or a bit rate over a channel spacing. The operator performs a manual tuning of the cards, i.e. by searching step-by-step for an optimum combination of line rates, bits per symbol (bps), and channel spacing. The manual configuration of the optical link is a complex process that is time-consuming.

BRIEF DESCRIPTION OF THE DRAWINGS

FIG. 6 is a flowchart illustrating a method of configuring an optical link, according to an example embodiment.

DESCRIPTION OF EXAMPLE EMBODIMENTS

Overview

Figure 1:
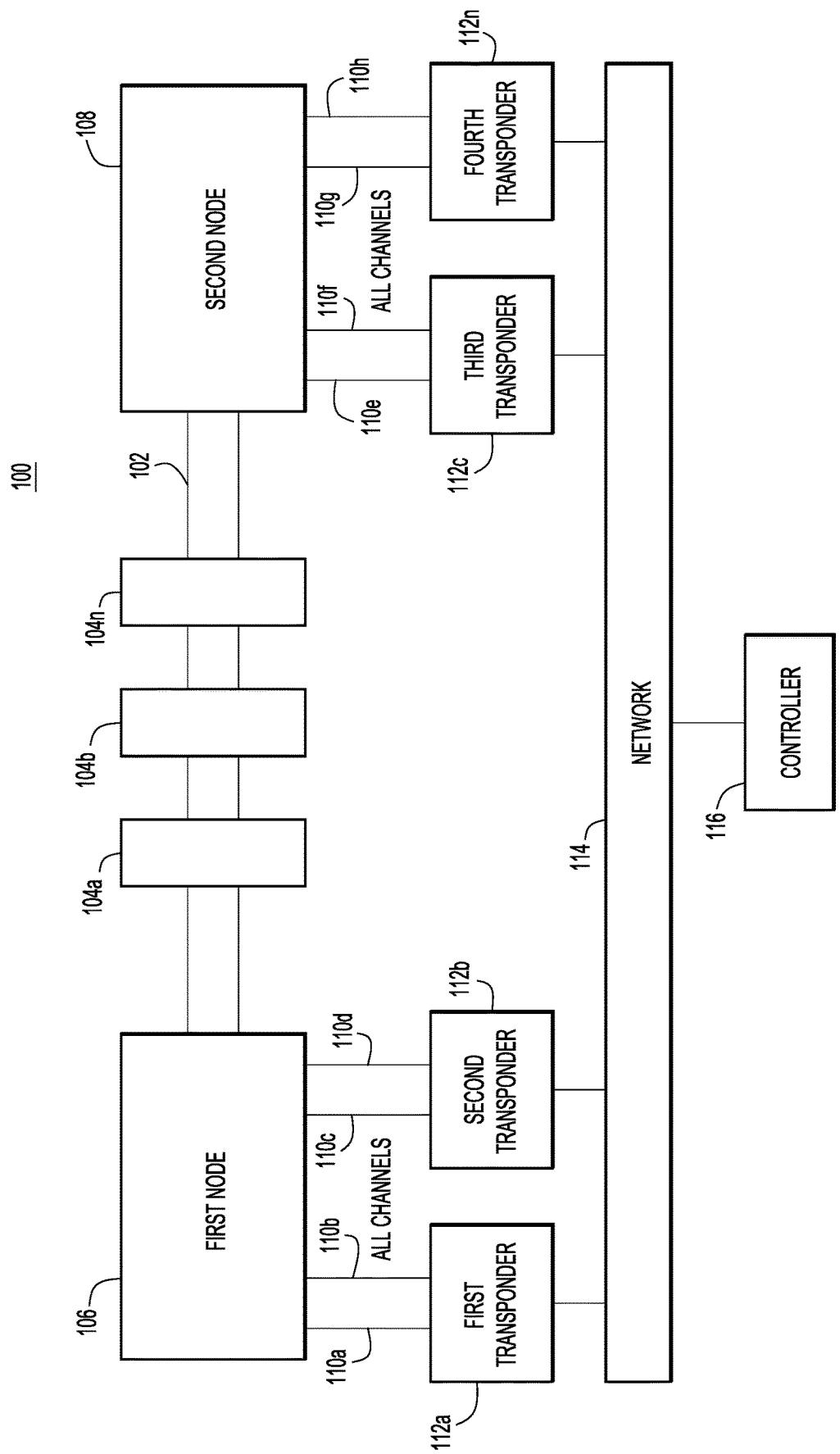
FIG. 1 is a block diagram illustrating an environment in which automatic bit rate and spectral efficiency optimization of an optical link may be implemented, according to an example embodiment.

Briefly, methods for configuring an optical link with an optimized spectral efficiency are provided. In these methods, a controller of an optical network obtains a baseline configuration that includes a traffic mode that uses a predetermined channel spacing of a plurality of channels in a frequency spectrum. The plurality of channels are used for transmitting optical signals on an optical link in the optical network. The controller selects three contiguous channels from among the plurality of channels of the frequency spectrum. The three contiguous channels include a center channel and two adjacent channels. While maintaining a performance parameter above or equal to a threshold value, the controller moves the adjacent channels closer to the center channel and varies at least one transmission parameter, thereby reducing a spacing of the center channel with respect to the two adjacent channels. The controller generates a spectral frequency map in which the channel spacing is reduced with respect to the baseline configuration. The controller configures, via an optical network element, the optical link based on the spectral frequency map.

EXAMPLE EMBODIMENTS

To facilitate the configuration of an optical link, conventional techniques involve a characterization of optical line cards that is exploited in test settings such as laboratories. Typically, system specifications and advanced theoretical analysis are used to predict performance of the optical link. These predictions are then used as guess points to optimize the spectral efficiency of the optical link.

An alternative approach considers optical link impairments and is based on an application of an Inverse Back-to-Back (B2B$^{-1}$) method to derive, from values of a Q-Factor measured in real-time in the field, corresponding values of a generalized signal to noise ratio (GSNR) at system inputs, and use them as guess points to find the proper combination of bits per symbol (bps)/line rate/channel spacing to maximize the SE. This approach requires performing full characterization of the line cards in the B2B method, for all traffic modes to be considered. With the advent of the hybrid modes technology, the grid of traffic modes to be considered for each line rate is wide. Moreover, the inverse B2B method assumes that the statistics of the overall noise coming from the link is Gaussian. This assumption is not always true.

In one or more example embodiments, an optical link is configured with an optimized SE using techniques implemented in real-time and in the field as opposed to a laboratory setting. Initialization starts from any traffic mode and without any guess points. The techniques are based on a Q-Margin as an example performance metric, and does not require any previous analysis of the optical link. Maximum SE is obtained by running the techniques at the installation of the optical link. According to one example embodiment, the techniques automatically consider impairments of the optical link and makes no assumptions on the statistics of the impairments of the optical link.

Specifically, the techniques involve a 3-channel probing approach with or without amplified spontaneous emission (ASE) loading, with a probe carrier line card, two adjacent aggressors and a real WDM comb. The techniques progressively check the Q-Margin of the optical link for each line rate, starting from the most reliable traffic mode, and applies on the current line rate a bisection algorithm on a full range of bps line rates, to converge towards a Q-Margin target according to a predefined accuracy. As such, the techniques automatically and in real-time, maximize the SE of the optical link.

FIG. 1 is a block diagram illustrating an optical network 100 in which automatic SE optimization of an optical link may be implemented, according to an example embodiment.

The optical network 100 may employ WDM or DWDM technologies. The optical network 100 includes optical links or lines (collectively or individually referred to as an optical link 102), optical amplifiers 104a, 104b, . . . 104n along a path between a first node 106 and a second node 108. The optical network 100 further includes optical network elements, such as a first transponder 112a, a second transponder 112b, a third transponder 112c, and a fourth transponder 112n. A controller 116 is provided that is in communication with the transponders 112a-112n via a network 114.

The transponders 112a-112n are coupled via optical fibers to the respective first node 106 and second node 108. For example, the first transponder 112a is coupled via a first optical fiber 110a and a second optical fiber 110b to the first node 106. The first optical fiber 110a carries an optical signal to the first node 106 from the first transponder 112a, and the second optical fiber 110b carries an optical signal from the first node 106 to the first transponder 112b. The optical signal carried in the fibers 110a and 110b spans various DWDM channels. Similarly, the second transponder 112b is coupled via optical fibers 110c and 110d to the first node 106, the third transponder 112c is coupled via optical fibers 110e and 110f to the second node 108, and the fourth transponder 112n is coupled via the optical fibers 110g and 110h also to the second node 108. The first node 106 handles the DWDM channels that need to be optimized via the respective optical fibers 110a, 110b, 110c and 110d and similarly the second node 108 handles the DWDM channels via the respective optical fibers 110e, 110f, 110g and 110h.

The notation a, b, c, n illustrates that the number of elements can vary depending on a particular implementation and is not limited to the number of elements depicted in the optical network 100.

In FIG. 1, the optical link 102 is connected between two terminal points or nodes (a first node 106 and a second node 108) without any filtering elements therein between. The optical link 102 may include the optical amplifiers 104a-104n provided to assist in propagating the optical signals along the length of the optical link 102. An example of the optical link 102 is one or more subterranean optical fibers or cables that transmit optical signals between the first node 106 and the second node 108 i.e., for bidirectional communication.

An example of the first node 106 and the second node 108 is an optical add/drop multiplexer (OADM) or a reconfigurable optical add/drop multiplexer (ROADM). The OADM or ROADM serves as an aggregation node when it transmits the optical signal via the optical link 102 and serves as a disaggregation node when it receives the optical signal from the optical link 102.

An aggregation node, i.e., first node 106 and second node 108, aggregates or combines optical signals received from some of the data sources i.e. the transponders 112a-112n. A disaggregation node separates the optical signals received from the optical link 102 and provides the separated optical signals to some of the data sources via some of the optical fibers 110a, 110b, 110c, 110d, 110e, 110f, and 110g. For example, the first transponder 112a transmits data to the first node 106 via a first optical fiber 110a and receives data from the first node 106 via a second optical fiber 110b. Analogously, the other data sources (transponders) transmit and receive data to a respective node via respective optical fibers, as shown in FIG. 1.

The first transponder 112a, second transponder 112b, third transponder 112c, and fourth transponder 112n may include components configured to provide bidirectional communication. For example, each of these optical network elements may include an optical transmitter and an optical receiver. The optical transmitter includes a transmit module and a transmitter digital signal processor (DSP) and an optical receiver include a receiver module and a receiver DSP. The transmit module and the receive module may be optical pluggable modules configured to transmit and receive optical signals, respectively. The DSPs process the optical signals and perform various signal processing operations, such as changing transmission parameters. These optical network elements may further include a processor and a memory. The processor controls the components of its optical network element, may change transmission parameters, and evaluate quality of signal (QoS) based on the information from the DSPs. The processor within each of the transponders 112a-112n changes the transmission parameters based on instructions from the controller 116.

The controller 116 controls the overall configuration of the optical network and communicates with the optical network elements via the network 114. The controller 116 symmetrically configures the optical network elements to optimize configuration parameters of the optical link 102 based on the techniques presented herein.

Figure 2:
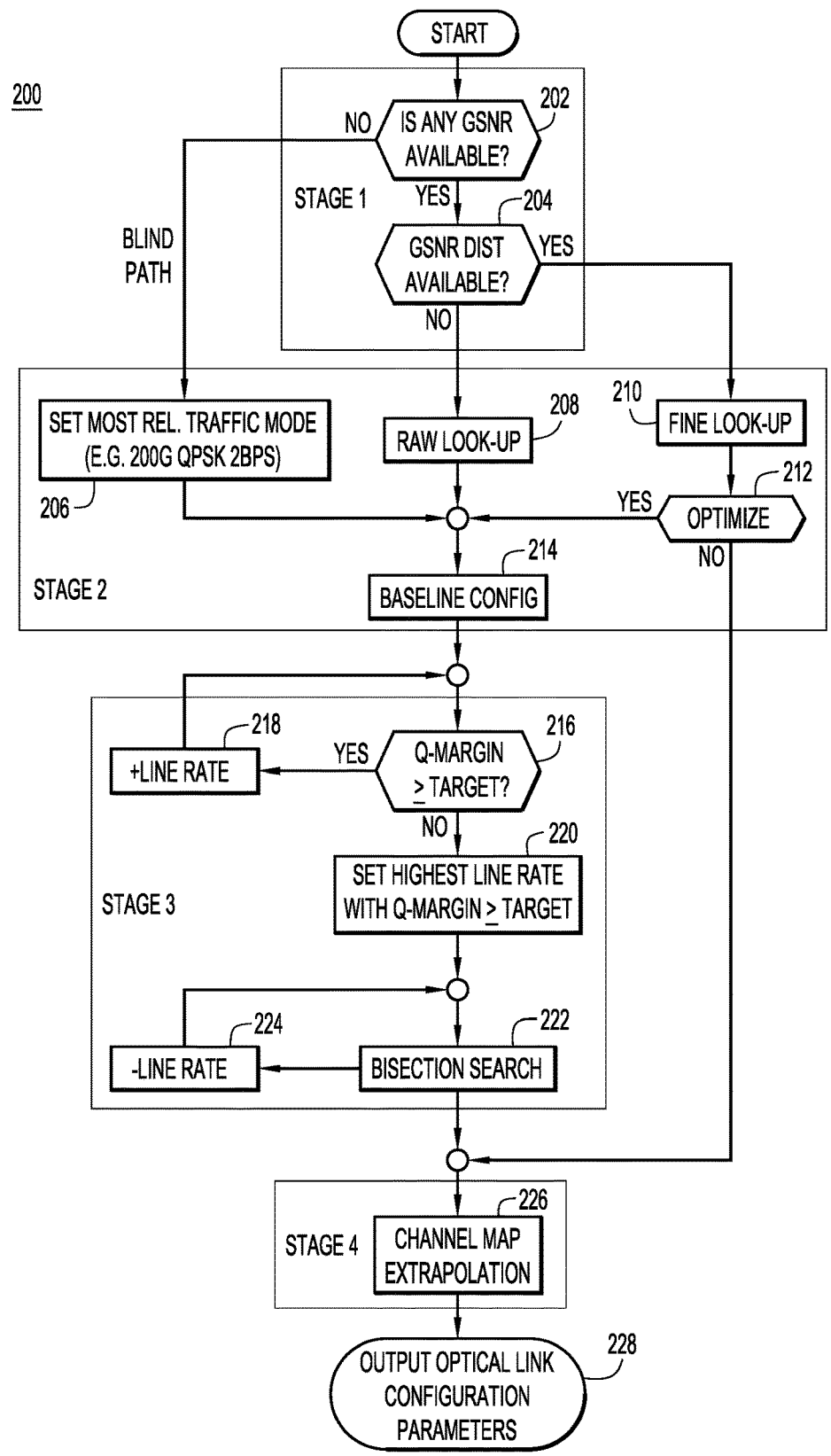
FIG. 2 is a flowchart illustrating a method of optimizing spectral efficiency of an optical link, according to an example embodiment.

Reference is now made to FIG. 2. FIG. 2 illustrates a flowchart of a method 200 for optimizing spectral efficiency of an optical link, such as the optical link 102 shown in FIG. 1, according to an example embodiment. The method 200 is performed by the controller 116. Reference is also made to FIG. 1 for purposes of the description of the method 200.

The method 200 includes four main stages:

Stage 1 involves obtaining input configuration parameters for optimizing SE of the optical link (if any);

Stage 2 involves setting base configuration parameters for generating a spectral frequency map;

Stage 3 involves executing three channel probing for a traffic mode with maximum SE that satisfies the condition of Q-margin≥Target; and Stage 4 involves shrinking the channels for the spectral frequency map based on an interpolation and extrapolation of the channels.

These stages are illustrated to facilitate and simplify the description of the method 200.

Stage 1 includes operations 202 and 204 of the method 200 in which input configuration parameters of the optical link 102 are determined and obtained.

Specifically, at 202, the controller 116 determines if any characteristics related to GSNR of the optical link 102 are available. For example, the characteristics may include a single worst GSNR value of the optical link 102 that is known or a trend of GSNR values across available bandwidth or frequency spectrum (referred herein interchangeably) of the optical link 102.

Based on not having any such GSNR related characteristics available (No at 202), the method 200 proceeds to a blind path processing, described below. On the other hand, based on having some input i.e., at least one value regarding the GSNR of the optical link 102 (Yes at 202), a guess point look up may be performed. At 204, the controller 116 further determines whether a trend (or distribution) of the GSNR values versus frequency is available or whether only a single worst GSNR value of the optical link 102 is provided.

Stage 2 includes operations 206-214 in which the base configuration is set. As explained above, when there are no GSNR characteristics available, blind path processing is performed. Blind path processing means that there are no guess points to start the optimization procedure. That is, at 206, default parameters are set for configuring the optical link 102. The controller 116 automatically selects the most reliable traffic mode compatible with an overall available bandwidth, expected capacity of the optical link 102, number of trunks, and other requirements for the optical link 102. For example, the controller 116 sets the traffic mode to 200

Gbps with a given modulation scheme, such as Quadrature Phase Shift Keying (QPSK) 2, as default parameters of the optical link 102. In an example embodiment, on request, any baseline configuration can be selected. The baseline configuration may include data uploaded from a baseline configuration file.

Specifically, when the controller 116 determines that only a single worst GSNR value of the optical link 102 is provided (No at 204), at 208, the controller 116 performs a raw look-up. The raw look-up involves starting from the worst GSNR value, searching a first GSNR look-up table for a suitable traffic mode and selecting the most suitable traffic mode that is compatible with the worst GSNR value.

On the other hand, when the controller 116 determines that the trend of the GSNR values versus frequency (GSNR distribution over a frequency band) is available (Yes at 204), then at 210, the controller 116 performs a fine look-up. The fine look-up involves starting from the trend of GSNR values versus frequency of the optical link 102, searching a second GSNR look-up table and, corresponding to each carrier frequency in the DWDM comb, selecting the more suitable traffic mode compatible with the GSNR trend. The second GSNR look-up table is a more complex look-up table that provides detailed characteristics of the optical link 102 such that further optimizations may not necessarily be required.

Accordingly, at 212, the controller 116 determines whether optimization of the system performance with the Q-margin measurement in real-time is still warranted. If the optimization is warranted (Yes at 212), the baseline configuration parameters are set at 214. On the other hand, if the optimization is not warranted (No at 212), the trend of GSNR values versus frequency is not exploited to optimize system performances with a Q-margin measurement in real-time and the method 200 proceeds directly to an operation 226 of Stage 4, bypassing operations 216-222 of Stage 3 (these operations are explained in detail below).

At 214, the baseline configuration is obtained. In the baseline configuration, all channels are configured according to the selected traffic mode with a corresponding channel spacing.

Figure 3:
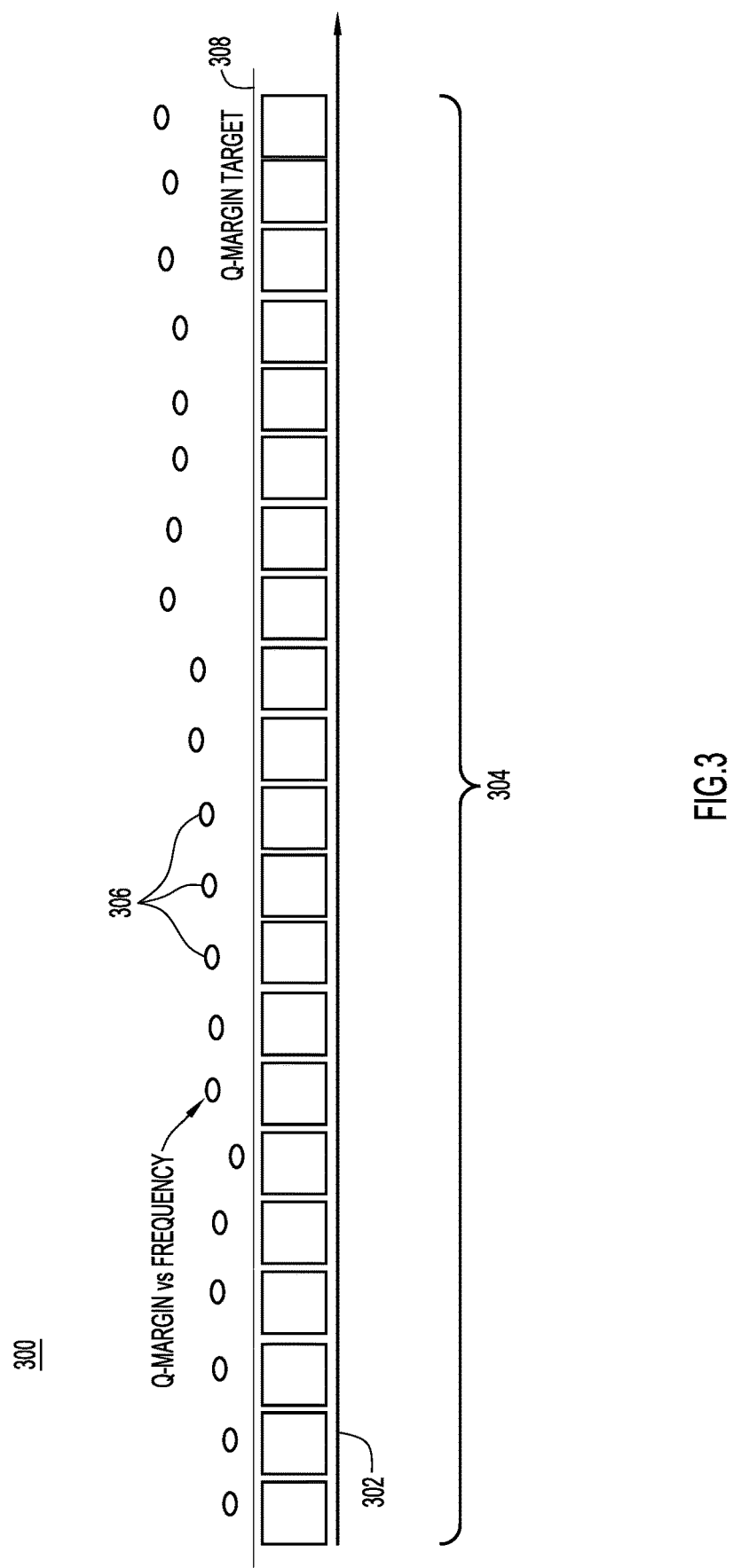
FIG. 3 is a view illustrating a baseline configuration for optimizing spectral efficiency of the optical link, according to an example embodiment.

FIG. 3 illustrates a baseline configuration 300 for optimizing spectral efficiency of the optical link, according to an example embodiment. The baseline configuration 300 is the output of the Stage 2 and is a starting point for the probing procedure of Stage 3.

The baseline configuration 300 includes a frequency spectrum 302 (available bandwidth) having a plurality of wavelength channels 304, typically depicted as equally spaced squares along the frequency spectrum 302. The shaded dots indicate Q-Margin for each frequency channel, shown at 306. The Q-margin of the channels 306 are above the Q-Margin target 308. The baseline configuration 300 is an example of a blind approach in which all of the channels 306 are configured according to a most reliable traffic mode (substantially above the Q-Margin target 308).

Referring back to FIG. 2, Stage 3 includes operations 216-224 in which the base configuration is optimized by a probing procedure. The controller 116 may select a full frequency spectrum or a subset of channels along the frequency spectrum (start and stop frequency) for the optimization.

At 216, at each selected channel, based on a measured parameter (e.g. bit error rate (BER)), the Q-margin is determined and compared to a target (e.g., Q-Margin target 308). The target may be one of the input parameters provided by an operator or set as a default by the controller 116 e.g., 1 or 2 dB. Based on determining that the Q-margin is greater or equal to the target, a traffic mode with a higher line rate is chosen at 218, and the Q-margin is derived again and compared to the target at 216. This iterative loop continues until at 216, the controller 116 determines that the Q-margin of the respective frequency is less than the target. At 220, the previous traffic mode which satisfied the condition of having the Q-margin greater or equal to the target is selected for the bisection search to be performed at operation 222. The previous traffic mode has the highest line rate and satisfies the condition of Q-margin≥target.

As noted above, the operations 216-220 can be bypassed if a preferred traffic mode has been selected and set, and the bisection search can be directly performed at operation 222 to optimize it. If the complete flow of operations 216-224 is performed, a full-feature optimization is warranted. If the operations 216-220 are bypassed, only a partial optimization is warranted, according to the preferred traffic mode selection.

At 222, a bisection search is performed. The bisection search at 222 is an optional operation and is provided to assure the convergence of the algorithm with the highest reliability. According to various example embodiments, different implementations that omit the bisection search may be provided e.g. guess points, interpolations-based algorithms, and so on. In the bisection search, the controller iteratively searches for the maximum SE that fulfills the condition: "Q-margin≥Target" at 216. The search iteratively varies the bps and the impairment produced on the selected channel according to the line rate selection, along the available bandwidth or the frequency spectrum. In an example embodiment, the bisection search at 222 includes a three channel probing technique described below, where the variation of the impairment on the channel is produced by moving the channel spacing. Any other option to change the impairment on the channel together with the bps is considered within the scope of an example embodiment e.g., by enhancing the number of aggressors to the selected channels or by varying the frequency location and the combination of a baud rate (BR) and guard band (GB) of the aggressors.

To further maximize SE of the optical link 102, at 224, the line rate may be decreased and the bisection search performed on the decreased line rate, at 222. This is an optional operation to account for the maximum SE being not necessarily at the highest line rate. Accordingly, the line rate may be decreased to maximize SE of the optical link.

Figure 4:
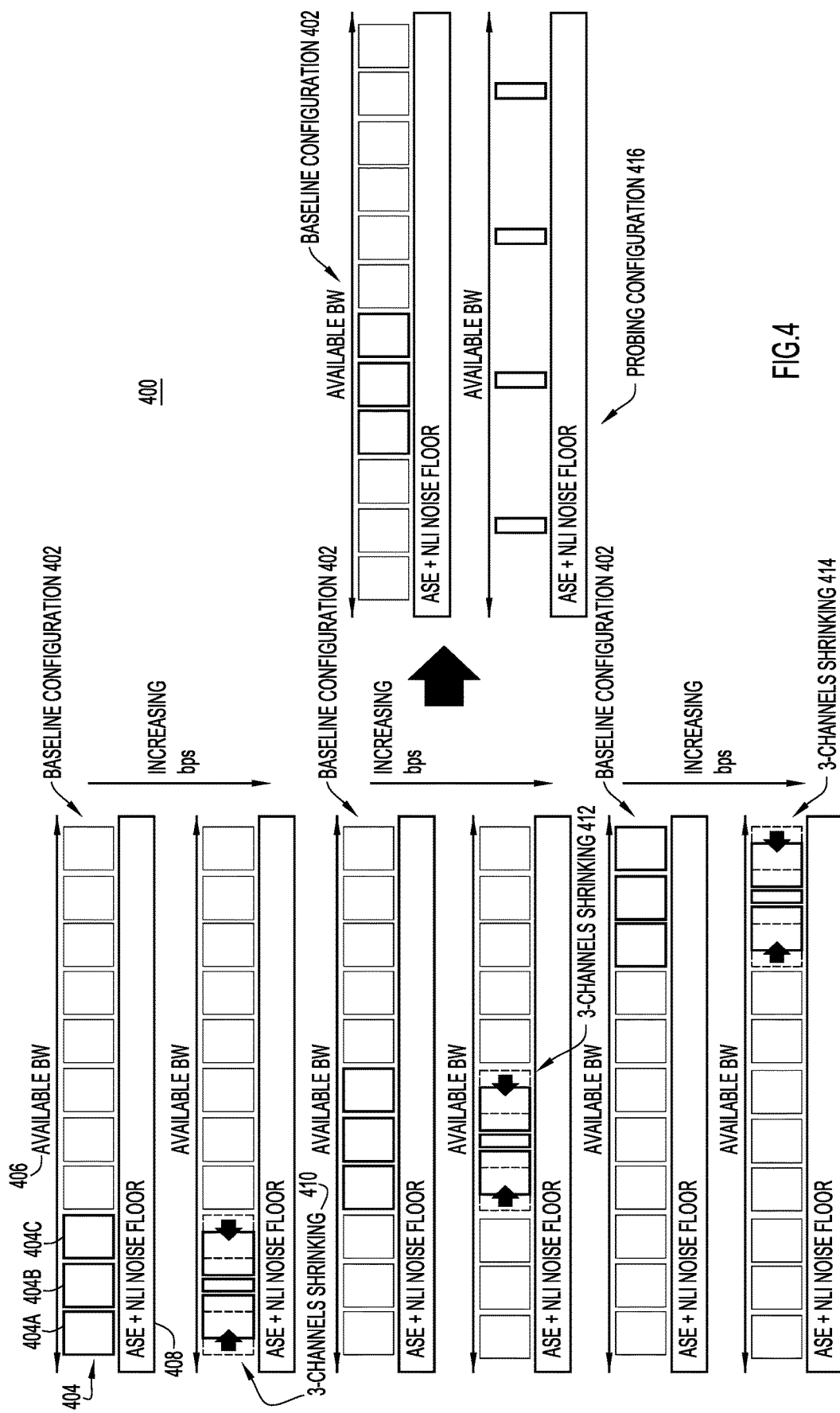
FIG. 4 is a diagram illustrating a probing method for optimizing spectral efficiency of the optical link, according to an example embodiment.

FIG. 4 is a diagram illustrating a probing method 400 for optimizing SE of the optical link, according to an example embodiment. The probing method 400 may start with a baseline configuration 402, in which the channels 404 are depicted as equally spaced squares along the frequency spectrum (available bandwidth 406).

The probing method 400 iteratively searches across the available bandwidth 406 using three channels at a time. A channel 404b is a probe carrier and channels 404a and 404c are adjacent channels (aggressors) i.e., two carrier frequencies symmetrically placed around the probe carrier. The channels 404a, 404b, and 404c may be with or without amplified spontaneous emission (ASE) loading and with or without cross-channel nonlinear interference (NSI) noise level floor (ASE and NLI noise floor 408).

The probing method iteratively searches for the maximum SE along the assigned bandwidth or frequency spectrum that fulfills the condition: "Q-margin≥Target" and is for the selected traffic mode (line rate), with a predefined granularity. At each channel frequency value e.g., the channel 404b, the optimal channel spacing is obtained by iteratively changing the bps line rate and shrinking the channel spacing of the two adjacent channels 404a and 404c, as shown at 410. At 412, the same process is performed yet again with the next three channels from among the channels 404 and at 414, the same process is performed with the last three channels from among the channels 404.

In short, the bps and line rate are increased and the channel spacing of the aggressors are shrunk closer to the center channel until the programmed Q-margin is available. Once the limit is reached, the probes are configured back to their baseline configuration and the same process is continued for the next three channels along the available bandwidth. Once the probing procedure is completed, a map of bps/BR/line rate versus channel frequency is obtained, with a resolution given by the selected three-channel granularity. This map is shown in FIG. 4 as a probing configuration 416.

The three-channel granularity of method 400 is by way of an example only. The mapping granularity may be one of the input parameters obtained from the user or a default value set by the controller 116 and may vary according to a particular implementation. More granularity will provide a better optimization of the SE of the optical link 102.

Referring back to FIG. 2, Stage 4 includes operation 226. At 226, the controller 116 further interpolates and extrapolates the probing configuration 416 (channel map) (shown in FIG. 4) by shrinking the channel spacing.

Figure 5:
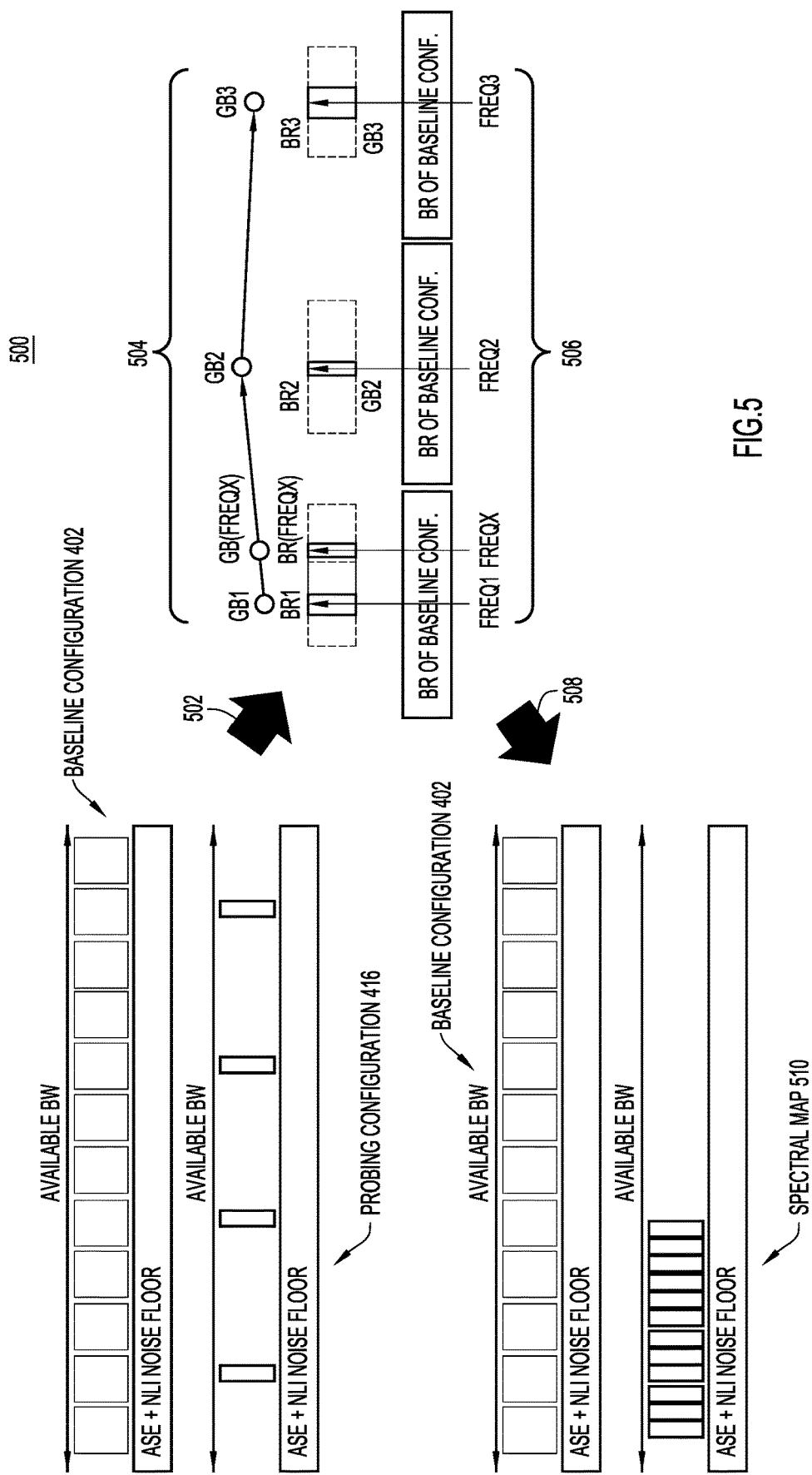
FIG. 5 is a diagram illustrating a method of generating a spectral map using a channel map extrapolation procedure for optimizing spectral efficiency of the optical link, according to an example embodiment.

Reference is now made to FIG. 5. FIG. 5 illustrates is a diagram depicting a method 500 of generating a spectral map using a channel map extrapolation procedure for maximizing SE of the optical link 102, according to an example embodiment.

In FIG. 5, the probing configuration 416 obtained from the baseline configuration 402 is depicted on the left side. Next, while maintaining the line rate fixed, BR/GB is extrapolated along the frequency bandwidth as follows.

At 502, frequency mappings are performed. As such, at 504, baseline configuration of each center channel (a BR of baseline configuration 506) has a corresponding value of BR and GB obtained from the probing procedure of the Stage 3. For example, values GB1/BR 1 at frequency 1, GB2/BR2 at frequency 2, and GB3/BR3 at frequency 3. These values are interpolated to perform proper fitting. In various example embodiments, various interpolation techniques may be performed such as a linear interpolation, a step-function, a polynomial, etc. Based on interpolating across these values, an interpolated value GB and BR at frequency X is obtained. At 508, the channels are shrunk based on the results of the interpolation procedure and the spectral map 510 is obtained. The channels are interpolated to progressively shrink channel spacing by minimizing bandwidth allocated to the channels and maximizing the SE. As a result of the interpolation, the values of the proper bps/BR/line rate can be extrapolated in correspondence of each frequency, and a higher resolution across the available bandwidth with respect to the baseline configuration 402 is obtained. A shrunk channel comb carrying different bps/BR/line rate combinations is then arranged. This is just one example embodiment to obtain an optimum configuration. Other example embodiments may exploit the spectral map procedure to obtain an acceptable configuration that may not be fully optimized.

Referring back to FIG. 2, at 228, the controller 116 outputs a set of configuration parameters to the optical network elements (transponders 112a-112n of FIG. 1). The set of the configuration parameters are based on the spectral map 510 shown in FIG. 5. The optical network elements configure the optical link 102 based on the received set of configuration parameters. The configuration parameters include the selected traffic mode (line rate), the optimized SE, and/or the optimized bit rate.

According to various example embodiments, the techniques presented herein derive, in real-time and in the field, optimal BR/bps with the maximum SE at a highest or at a given line rate for a given system configuration. Using a subset of contiguous channels (a mapping granularity is defined), adjacent channels are moved closer and closer to the center channel frequency according to a predefined GB vs BR vs Line Rate trend. Further at least one transmission parameter may be varied. The adjacent channels are moved closer to the center channel to produce a desired cross-talk impairment, by correspondingly varying the line rate and bps/BR. The center channel frequency is shifted by an amount equal to the mapping granularity and the operations are repeated until all available channels are covered. The maximum line rate/bps/BR/GB with Q-Margin≥Target in correspondence of each probe carrier is assigned and a best fitting of line rate/bps/BR/GB vs. frequency is performed to derive a trend of line rate/bps/BR/GB vs. frequency. As a result, a spectral map with line rate/bps/BR/GB/Q-Margin vs. Frequency is generated.

In various example embodiments, these techniques converge to a traffic mode with maximum SE and maximum line rate. According to various example embodiments, different transmission, measurement, and performance parameters may be used. For example, SNR, GSNR, OSNR, pre-Forward Error Correction Bit Error Rate (pre FEC BER), Q-Factor, mutual information (MI) performance metrics, and/or general MI (GMI) performance metrics are used. Further, a traffic mode may be defined by various transmission parameters such as baud rate, bps rate, line rate, and/or channel spacing.

FIG. 6 is a flowchart of a method 600 for configuring an optical link, according to an example embodiment. The method 600 is performed by a controller of an optical network e.g., the controller 116 shown in FIG. 1.

At 602, the controller obtains a baseline configuration that includes a traffic mode that uses a predetermined channel spacing of a plurality of channels in a frequency spectrum, where the plurality of channels are used for transmitting optical signals on an optical link in the optical network.

At 604, the controller selects three contiguous channels from among the plurality of channels of the frequency spectrum, where the three contiguous channels include a center channel and two adjacent channels.

At 606, while maintaining a performance parameter above or equal to a threshold value, the controller moves the adjacent channels closer to the center channel and varies at least one transmission parameter, thereby reducing a spacing of the center channel with respect to the two adjacent channels.

At 608, the controller generates a spectral frequency map in which the channel spacing is reduced with respect to the baseline configuration based on reducing the spacing of the center channel.

At 610, the controller configures, via an optical network element in the optical network, the optical link based on the spectral frequency map.

According to one or more example embodiments, the selecting operation 604 and the moving and varying operation 606 are iteratively performed across a selected portion of the frequency spectrum based on a predetermined mapping granularity.

According to one or more example embodiments, the moving and varying operation 606 may include increasing a value of the at least one transmission parameter on the center channel, shrinking the channel spacing of the two adjacent channels, measuring the performance parameter of the center channel, and determining whether the performance parameter of the center channel is above or equal to the threshold value.

According to one or more example embodiments, the moving and varying operation 606 may include, based on determining that the performance parameter of the center channel is above or equal to the threshold value, increasing the value of the at least one transmission parameter, further shrinking the channel spacing of the two adjacent channels, and measuring the performance parameter of the center channel. The moving and varying operation 606 may further include, based on determining that the performance parameter of the center channel is less than the threshold value, decreasing the at least one transmission parameter to a previous value and returning the two adjacent channels to a previous channel spacing, thereby obtaining a tuned configuration of the center channel. The generating operation 608 may further include applying the tuned configuration of the center channel to the spectral frequency map.

According to one or more example embodiments, the method 600 may further include the controller selecting next three contiguous channels from among the plurality of channels of the frequency spectrum based on a predetermined mapping granularity and moving the adjacent channels and varying the at least one transmission parameter for the next three contiguous channels to obtain a tuned configuration of the center channel of the next three contiguous channels. The at least one transmission parameter includes a bit per symbol rate or a baud rate and the performance parameter includes a Q-factor, a bit error rate, or a forward error correction.

According to one or more example embodiments, the measuring operation of the method 600 may include measuring a bit error rate on the center channel and deriving a Q-margin based on the bit error rate. The transmission parameter includes a bits per symbol rate or a baud rate.

According to one or more example embodiments, the method 600 may further include interpolating the spectral frequency map to progressively shrink the plurality of channels of the frequency spectrum by minimizing bandwidth allocated to the plurality of channels and maximizing spectral efficiency at a predetermined line rate.

According to one or more example embodiments, the obtaining operation 602 may include determining whether the performance parameter of the optical link is available. The performance parameter includes a signal-to-noise ratio. The obtaining operation 602 may further include determining whether the performance parameter includes a plurality of performance related distribution values across the frequency spectrum and setting the baseline configuration based on the performance parameter.

According to one or more example embodiments, the setting operation of the method 600 may include setting the traffic mode to a default traffic mode based on the performance parameter not being available.

According to one or more example embodiments, the method 600 may further include determining an optimal traffic mode in which a line rate is optimized while keeping the performance parameter equal to or above the threshold value and applying the optimal traffic mode to the baseline configuration.

Figure 7:
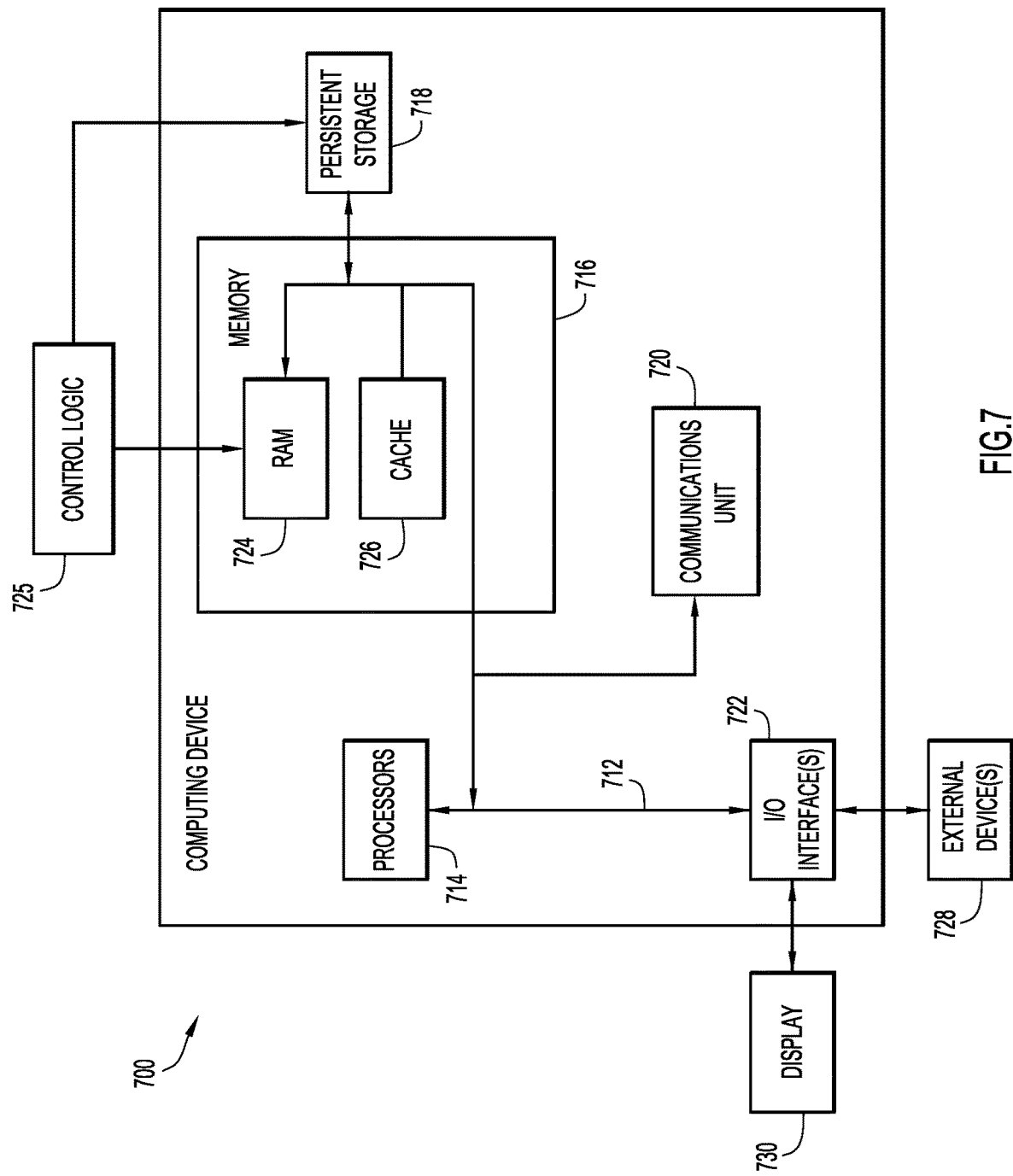
FIG. 7 is a hardware block diagram of a computing device configured to perform the techniques of optimizing spectral efficiency, according to various example embodiments.

FIG. 7 is a hardware block diagram illustrating a computing device 700 that may perform the functions of a computing or control entity referred to herein in connection with FIGS. 1-6, according to an example embodiment. The computing device 700 performs the functions of the controller 116 of FIG. 1. The computing device 700 may take the form of a virtual machine cluster or third-party cloud computing environment.

It should be appreciated that FIG. 7 provides only an illustration of one embodiment and does not imply any limitations with regard to the environments in which different embodiments may be implemented. Many modifications to the depicted environment may be made.

As depicted, the computing device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the control logic 725 may be stored in memory 716 or persistent storage 718 for execution by processor(s) 714.

The control logic 725 includes instructions that, when executed by the computer processor(s) 714, cause the computing device 700 to perform one or more of the methods described herein including a method of configuring an optical link based on a generated spectral map. The control logic 725 may be stored in the memory 716 or the persistent storage 718 for execution by the computer processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computing device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

In still another example embodiment, an apparatus is a controller of an optical network. The apparatus includes a communication interface configured to enable network communications, a memory configured to store executable instructions, and a processor coupled to the communication interface and the memory. The processor is configured to perform operations that include obtaining a baseline configuration that includes a traffic mode that uses a predetermined channel spacing of a plurality of channels in a frequency spectrum, where the plurality of channels are used for transmitting optical signals on an optical link in the optical network and selecting three contiguous channels from among the plurality of channels of the frequency spectrum, where the three contiguous channels include a center channel and two adjacent channels. The operations further include, while maintaining a performance parameter above or equal to a threshold value, moving the adjacent channels closer to the center channel and varying at least one transmission parameter, thereby reducing a spacing of the center channel with respect to the two adjacent channels. The operations further include generating a spectral frequency map in which the channel spacing is reduced with respect to the baseline configuration based on reducing the spacing of the center channel and configuring, via an optical network element in the optical network, the optical link based on the spectral frequency map.

According to one or more example embodiments, the processor may further be configured to iteratively perform selecting the three contiguous channels, moving the adjacent channels, and varying the at least one transmission parameter, across a selected portion of the frequency spectrum based on a predetermined mapping granularity.

According to one or more example embodiments, the processor may further be configured to move the adjacent channels and to vary the at least one transmission parameter by: increasing a value of the at least one transmission parameter on the center channel, shrinking the channel spacing of the two adjacent channels, measuring the performance parameter of the center channel, and determining whether the performance parameter of the center channel is above or equal to the threshold value.

According to one or more example embodiments, the processor may further be configured to move adjacent channels and to vary the at least one transmission parameter by: based on determining that the performance parameter of the center channel is above or equal to the threshold value, increasing the value of the at least one transmission parameter, further shrinking the channel spacing of the two adjacent channels, and measuring the performance parameter of the center channel and based on determining that the performance parameter of the center channel is less than the threshold value, decreasing the at least one transmission parameter to a previous value and returning the two adjacent channels to a previous channel spacing, thereby obtaining a tuned configuration of the center channel. The processor may further be configured to generate the spectral frequency map by applying the tuned configuration of the center channel to the spectral frequency map.

According to one or more example embodiments, the processor may further be configured to select next three contiguous channels from among the plurality of channels of the frequency spectrum based on a predetermined mapping granularity and move the adjacent channels and vary the at least one transmission parameter for the next three contiguous channels to obtain a tuned configuration of the center channel of the next three contiguous channels. The at least one transmission parameter includes a bit per symbol rate or a baud rate and the performance parameter includes a Q-factor, a bit error rate, or a forward error correction.

In yet another example embodiment, one or more non-transitory computer readable storage media encoded with instructions are provided. When the media is executed by the processor, the instructions cause the processor to perform operations including obtaining a baseline configuration that includes a traffic mode that uses a predetermined channel spacing of a plurality of channels in a frequency spectrum. The plurality of channels are used for transmitting optical signals on an optical link in an optical network. The operations further include selecting three contiguous channels from among the plurality of channels of the frequency spectrum. The three contiguous channels include a center channel and two adjacent channels. The operation further include, while maintaining a performance parameter above or equal to a threshold value, moving the adjacent channels closer to the center channel and varying at least one transmission parameter, thereby reducing a spacing of the center channel with respect to the two adjacent channels. The operations further include generating a spectral frequency map in which the channel spacing is reduced with respect to the baseline configuration based on reducing the spacing of the center channel and configuring, via an optical network element in the optical network, the optical link based on the spectral frequency map.

According to one or more example embodiments, the instructions further cause the processor to iteratively perform selecting the three contiguous channels, moving the adjacent channels, and varying the at least one transmission parameter, across a selected portion of the frequency spectrum based on a predetermined mapping granularity.

According to one or more example embodiments, the instructions further cause the processor to move the adjacent channels and to vary the at least one transmission parameter by: increasing a value of the at least one transmission parameter on the center channel, shrinking the channel spacing of the two adjacent channels, measuring the performance parameter of the center channel, and determining whether the performance parameter of the center channel is above or equal to the threshold value.

According to one or more example embodiments, the instructions further cause the processor to move adjacent channels and to vary the at least one transmission parameter by: based on determining that the performance parameter of the center channel is above or equal to the threshold value, increasing the value of the at least one transmission parameter, further shrinking the channel spacing of the two adjacent channels, and measuring the performance parameter of the center channel and based on determining that the performance parameter of the center channel is less than the threshold value, decreasing the at least one transmission parameter to a previous value and returning the two adjacent channels to a previous channel spacing, thereby obtaining a tuned configuration of the center channel. The instructions further cause the processor to generate the spectral frequency map by applying the tuned configuration of the center channel to the spectral frequency map.

According to one or more example embodiments, the instructions further cause the processor to perform additional operations of selecting next three contiguous channels from among the plurality of channels of the frequency spectrum based on a predetermined mapping granularity and moving the adjacent channels and varying the at least one transmission parameter for the next three contiguous channels to obtain a tuned configuration of the center channel of the next three contiguous channels. The at least one transmission parameter includes a bit per symbol rate or a baud rate and the performance parameter includes a Q-factor, a bit error rate, or a forward error correction.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining, by a controller of an optical network, a baseline configuration that includes a traffic mode that uses a predetermined channel spacing of a plurality of channels in a frequency spectrum, wherein the plurality of channels are used for transmitting optical signals on an optical link in the optical network;
selecting, by the controller, three contiguous channels from among the plurality of channels of the frequency spectrum, wherein the three contiguous channels include a center channel and two adjacent channels;
while maintaining a performance parameter above or equal to a threshold value, moving, by the controller, the two adjacent channels closer to the center channel, and varying, by the controller, at least one transmission parameter, thereby reducing a spacing of the center channel with respect to the two adjacent channels;
generating, by the controller, a spectral frequency map in which the channel spacing is reduced with respect to the baseline configuration based on reducing the spacing of the center channel; and
configuring, by the controller via an optical network element in the optical network, the optical link based on the spectral frequency map.

2. The method of claim 1, wherein selecting the three contiguous channels, moving the adjacent channels, and varying the at least one transmission parameter, are iteratively performed across a selected portion of the frequency spectrum based on a predetermined mapping granularity.

3. The method of claim 1, wherein the moving the adjacent channels and the varying of the at least one transmission parameter includes:
increasing a value of the at least one transmission parameter on the center channel;
shrinking the channel spacing of the two adjacent channels;
measuring the performance parameter of the center channel; and
determining whether the performance parameter of the center channel is above or equal to the threshold value.

4. The method of claim 3, wherein the moving the adjacent channels and the varying of the at least one transmission parameter further includes:
based on determining that the performance parameter of the center channel is above or equal to the threshold value, increasing the value of the at least one transmission parameter, further shrinking the channel spacing of the two adjacent channels, and measuring the performance parameter of the center channel; and
based on determining that the performance parameter of the center channel is less than the threshold value, decreasing the at least one transmission parameter to a previous value and returning the two adjacent channels to a previous channel spacing, thereby obtaining a tuned configuration of the center channel, and
wherein generating the spectral frequency map includes applying the tuned configuration of the center channel to the spectral frequency map.

5. The method of claim 3, further comprising:
selecting, by the controller, next three contiguous channels from among the plurality of channels of the frequency spectrum based on a predetermined mapping granularity; and
moving the adjacent channels and varying the at least one transmission parameter for the next three contiguous channels to obtain a tuned configuration of the center channel of the next three contiguous channels,
wherein the at least one transmission parameter includes a bit per symbol rate or a baud rate and the performance parameter includes a Q-factor, a bit error rate, or a forward error correction.

6. The method of claim 3, wherein measuring the performance parameter includes:
measuring a bit error rate on the center channel; and
deriving a Q-margin based on the bit error rate,
wherein the transmission parameter includes a bits per symbol rate or a baud rate.

7. The method of claim 1, further comprising:
interpolating the spectral frequency map to progressively shrink the plurality of channels of the frequency spectrum by minimizing bandwidth allocated to the plurality of channels and maximizing spectral efficiency at a predetermined line rate.

8. The method of claim 1, wherein obtaining the baseline configuration includes:
determining whether the performance parameter of the optical link is available, the performance parameter including a signal-to-noise ratio;
determining whether the performance parameter includes a plurality of performance related distribution values across the frequency spectrum; and
setting the baseline configuration based on the performance parameter.

9. The method of claim 8, wherein setting the baseline configuration includes:
setting the traffic mode to a default traffic mode based on the performance parameter not being available.

10. The method of claim 1, further comprising:
determining an optimal traffic mode in which a line rate is optimized while keeping the performance parameter equal to or above the threshold value; and
applying the optimal traffic mode to the baseline configuration.

11. An apparatus comprising:
a communication interface configured to enable network communications;
a memory configured to store executable instructions; and
a processor coupled to the communication interface and the memory and configured to perform operations including:
obtaining a baseline configuration that includes a traffic mode that uses a predetermined channel spacing of a plurality of channels in a frequency spectrum, wherein the plurality of channels are used for transmitting optical signals on an optical link in an optical network;
selecting three contiguous channels from among the plurality of channels of the frequency spectrum, wherein the three contiguous channels include a center channel and two adjacent channels;

while maintaining a performance parameter above or equal to a threshold value, moving the adjacent channels closer to the center channel, and varying at least one transmission parameter, thereby reducing a spacing of the center channel with respect to the two adjacent channels;

generating a spectral frequency map in which the channel spacing is reduced with respect to the baseline configuration based on reducing the spacing of the center channel; and configuring, via an optical network element in the optical network, the optical link based on the spectral frequency map.

12. The apparatus of claim 11, wherein the processor is configured to iteratively perform selecting the three contiguous channels, moving the adjacent channels, and varying the at least one transmission parameter, across a selected portion of the frequency spectrum based on a predetermined mapping granularity.

13. The apparatus of claim 11, wherein the processor is configured to move the adjacent channels and to vary the at least one transmission parameter by:

increasing a value of the at least one transmission parameter on the center channel;

shrinking the channel spacing of the two adjacent channels;

measuring the performance parameter of the center channel; and determining whether the performance parameter of the center channel is above or equal to the threshold value.

14. The apparatus of claim 13, wherein the processor is configured to move the two adjacent channels and to vary the at least one transmission parameter by:

based on determining that the performance parameter of the center channel is above or equal to the threshold value, increasing the value of the at least one transmission parameter, further shrinking the channel spacing of the two adjacent channels, and measuring the performance parameter of the center channel; and based on determining that the performance parameter of the center channel is less than the threshold value, decreasing the at least one transmission parameter to a previous value and returning the two adjacent channels to a previous channel spacing, thereby obtaining a tuned configuration of the center channel, and wherein the processor is configured to generate the spectral frequency map by applying the tuned configuration of the center channel to the spectral frequency map.

15. The apparatus of claim 13, wherein the processor is further configured to:

select next three contiguous channels from among the plurality of channels of the frequency spectrum based on a predetermined mapping granularity; and move the adjacent channels and vary the at least one transmission parameter for the next three contiguous channels to obtain a tuned configuration of the center channel of the next three contiguous channels, wherein the at least one transmission parameter includes a bit per symbol rate or a baud rate and the performance parameter includes a Q-factor, a bit error rate, or a forward error correction.

16. One or more non-transitory computer readable storage media encoded with instructions that, when executed by a processor, cause the processor to perform operations including:

obtaining a baseline configuration that includes a traffic mode that uses a predetermined channel spacing of a plurality of channels in a frequency spectrum, wherein the plurality of channels are used for transmitting optical signals on an optical link in an optical network;

selecting three contiguous channels from among the plurality of channels of the frequency spectrum, wherein the three contiguous channels include a center channel and two adjacent channels;

while maintaining a performance parameter above or equal to a threshold value, moving the adjacent channels closer to the center channel and varying at least one transmission parameter, thereby reducing a spacing of the center channel with respect to the two adjacent channels;

generating a spectral frequency map in which the channel spacing is reduced with respect to the baseline configuration based on reducing the spacing of the center channel; and configuring, via an optical network element in the optical network, the optical link based on the spectral frequency map.

17. The one or more non-transitory computer readable storage media according to claim 16, wherein the instructions further cause the processor to iteratively perform selecting the three contiguous channels, moving the two adjacent channels, and varying the at least one transmission parameter, across a selected portion of the frequency spectrum based on a predetermined mapping granularity.

18. The one or more non-transitory computer readable storage media according to claim 16, wherein the instructions cause the processor to move the two adjacent channels and to vary the at least one transmission parameter by:

increasing a value of the at least one transmission parameter on the center channel;

shrinking the channel spacing of the two adjacent channels;

measuring the performance parameter of the center channel; and determining whether the performance parameter of the center channel is above or equal to the threshold value.

19. The one or more non-transitory computer readable storage media according to claim 18, wherein the instructions cause the processor to move adjacent channels and to vary the at least one transmission parameter by:

based on determining that the performance parameter of the center channel is above or equal to the threshold value, increasing the value of the at least one transmission parameter, further shrinking the channel spacing of the two adjacent channels, and measuring the performance parameter of the center channel; and based on determining that the performance parameter of the center channel is less than the threshold value, decreasing the at least one transmission parameter to a previous value and returning the two adjacent channels to a previous channel spacing, thereby obtaining a tuned configuration of the center channel, and wherein the instructions cause the processor to generate the spectral frequency map by applying the tuned configuration of the center channel to the spectral frequency map.

20. The one or more non-transitory computer readable storage media according to claim 18, wherein the instructions further cause the processor to perform additional operations of:

selecting next three contiguous channels from among the plurality of channels of the frequency spectrum based on a predetermined mapping granularity; and moving the two adjacent channels and vary the at least one transmission parameter for the next three contiguous channels to obtain a tuned configuration of the center channel of the next three contiguous channels, wherein the at least one transmission parameter includes a bit per symbol rate or a baud rate and the performance parameter includes a Q-factor, a bit error rate, or a forward error correction.

\* \* \* \* \*